Patented Feb. 4, 1941

2,230,257

UNITED STATES PATENT OFFICE 2,230,257

CYANINE DYES AND METHOD FOR PREPARATION THEREOF

Edmund B. Middleton, New Brunswick, and George A. Dawson, North Brunswick Township, Middlesex County, N. J., assignors to Du Pont Film Manufacturing Corporation, New York, N. Y., a corporation of Delaware No Drawing. Application April 30, 1937, Serial No. 140,046

9 Claims. (Cl. 260—40)

This invention relates to a new and useful method for preparing certain types of cyanine dyes. It further relates to certain new and useful cyanine dyes.

The dyes with which the invention is concerned are cyanine dyes of the type having a thiazole, oxazole or selenazole nucleus connected through a methine carbon atom to another thiazole, oxazole or selenazole nucleus, and particularly thiocyanines, selenocyanines and thioselenocyanines.

It is an object of the invention to provide a new and improved method of preparing dyes of the type described above. A further object is the provision of a general method for preparing said dyes which is readily adapted to the preparation of either symmetrical or unsymmetrical dyes. An additional object is the preparation of certain new unsymmetrical cyanines which are useful as photographic sensitizers. Other objects will appear hereinafter.

In accomplishing these objects in accordance with the invention, we have found that a quaternary salt such as a 2-halogen benzothiazole quaternary salt will react with a 2-alkyl quaternary salt of an oxazole, selenazole or thiazole under the influence of heat in the presence of a basic condensing agent to produce symmetrical and unsymmetrical cyanine dyes.

Among the dyes which may be prepared in accordance with our invention are those having the following general formulas:

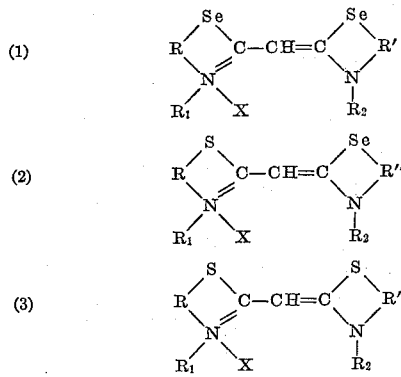

in which R and R' represent dissimilar radicals of the benzene or naphthalene series, R'' represents a radical of the benzene or naphthalene series which may be the same or different from R, R₁ and R₂ represent alkyl, and X represents the negative radical of an acid.

Of the compounds prepared in accordance with this invention, the selenocyanines and particularly unsymmetrical selenocyanines are preferred compounds. These may be represented by the following general formula:

(4) 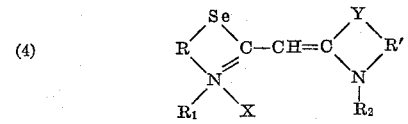

in which R and R' represent the same or different aromatic radicals of the benzene or naphthalene series, R₁ and R₂ represent alkyl, Y represents a member of the oxygen group of elements, e. g., oxygen, sulfur, selenium, and X represents the negative radical of an acid. It is preferable that either R and R' be dissimilar or that Y be oxygen or sulfur if R and R' are the same.

It will be understood that the radicals R, R' and R'' in the foregoing formulas may contain substituents, for example, halogen atoms (chlorine, bromine, fluorine and iodine), alkyl radicals (methyl, ethyl, isopropyl, butyl, etc.), alkoxy (methoxy, ethoxy, etc.) amino and substituted amino (dimethyl amino, diethyl amino, etc.). Particularly good results are obtained in the preparation of dyes having an alkyl group such as a methyl group in the 5-position of a benzoselenazole or benzothiazole ring.

The preparation of a 2-halogeno benzothiazole has been described in the literature (e. g., Hofmann, Ber. 12, 1127). Another method is to make 2-aminobenzothiazoles, as described by Kaufman and Küchner, Ber. 67, 944 (1934), or by Hunter, J. C. S. 1925, 2023, and convert these to 2-chlorobenzothiazoles by the usual methods of replacing primary amine groups with halogen atoms. The 2-halogeno benzoselenazoles may be prepared as hereinafter described in the examples. The quaternary salts of the 2-halogeno thiazoles and selenazoles are prepared in the usual manner by reacting the free base with an ester of an organic or inorganic acid, such as dimethyl sulfate, ethyl iodide, ethyl para-toluene sulfonate, a chlorate or similar compound.

The invention will be further illustrated but is not limited by the following examples in which the quantities are stated in parts by weight.

Example I

*Preparation of 2-amino-6-methyl benzoselenazole*

A mixture was made of 24.3 parts p-toluidine, 129 parts cupric selenocyanate, and 432 parts of glacial acetic acid. This was shaken and stirred well for 1½ hours at 60° C. to 70° C. No visible change took place, but the solution was treated with 100 parts of 10% hydrochloric acid, heated to 100° C. and filtered. The black residue was extracted several times with boiling water, and the combined filtrates made strongly ammoniacal. A flocculent brown precipitate was obtained which only partially dissolved in ethyl alcohol.

The crystals obtained from the alcohol solution were recrystallized again from hot water, and obtained as fine white needles, (M. P. 160–161° C.)

EXAMPLE II

Preparation of 2-chloro-6-methyl benzoselenazole

Five parts of 2-amino-6-methyl benzoselenazole were treated with 7 parts concentrated hydrochloric acid, and after the reaction was over, diluted with 10 parts of water. The solution was cooled to 0° C. and diazotized with 1.64 parts sodium nitrite dissolved in 25 parts water. The diazotized solution was allowed to stand three-quarters of an hour in the ice bath and then 60 parts of concentrated hydrochloric acid were added. The solution was warmed gently for 12 hours on a steam bath and then heated strongly with steam, until evolution of gases ceased and the product was reduced to an oily tar. The solution was extracted with ether, dried over calcium chloride and the ether evaporated. The residue was a yellow sweet smelling oil which crystallized readily at room temperature (M. P. 145–148° C.).

EXAMPLE III

Preparation of 2-iodo-6-methyl benzoselenazole ethiodide 0.6 part of 2-chloro-6-methyl benzoselenazole was refluxed 60 hours with 9.7 parts ethyl iodide. A brown solid formed, melting at 275–280° C. with decomposition.

EXAMPLE IV

Preparation of 2-amino-6-methyl benzothiazole

A mixture was prepared from 274 parts cupric sulfocyanate, 78 parts p-toluidine and 1320 parts acetic acid. This was shaken or stirred at 60° C. until the black cupric salt was reduced to cream colored cuprous sulfocyanate. The mixture was then treated with 200 parts of 10% hydrochloric acid, and heated to 80–90° C., then filtered and the residue extracted with boiling water several times. The combined filtrates were made ammoniacal and the flocculent precipitate crystallized from chloroform diluted if necessary with petroleum ether. The product was obtained as white crystals, melting at 137° C.

EXAMPLE V

Preparation of 2-chloro-6-methyl benzothiazole

Twelve parts 2-amino-6-methyl benzothiazole were treated with 31 parts concentrated hydrochloric acid and then with 55 parts of water. The solution was cooled to 0° C. and diazotized with 5.5 parts of sodium nitrite. The diazotized solution was allowed to stand three-quarters of an hour in its ice bath and then 60 parts concentrated hydrochloric acid added. After standing 15 minutes at room temperature, the mixture was heated gently on a steam bath until evolution of nitrogen ceased, and a dark oily layer was left. The solution was extracted with ether, dried over calcium chloride and the ether evaporated. The residue was an orange-brown aromatic smelling oil.

EXAMPLE VI

Preparation of 2-iodo-6-methyl benzothiazole ethiodide 1.4 parts 2-chloro-6-methyl benzothiazole was refluxed with 6 parts ethyl iodide for three days. A brown solid formed at first but decomposition set in after 2½ days. The product was washed with ether and recrystallized from alcohol.

EXAMPLE VII

Preparation of 3,3'-diethyl 6,5'-dimethyl selenocyanine iodide

A mixture of 0.5 part of 2-iodo-6-methyl benzoselenazole ethiodide, .38 part 2,5-dimethyl benzoselenazole ethiodide, 20 parts absolute alcohol was heated to reflux and treated with 0.463 part (2.2 mole) of tri-n-propylamine. Refluxing was continued for thirty minutes, following by cooling and filtering the dye crystals. After several crystallizations from alcohol, the product was obtained as orange crystals.

When a solution of this compound is added to a photographic emulsion (for example, .030 gram dissolved in 30 cc. of alcohol, added to 1 liter of silver chloride emulsion) there results an added sensitivity with maximum at 4700 Å.

EXAMPLE VIII

Preparation of 3,3'-diethyl thioselenocyanine iodide

Five parts of 2-iodobenzothiazole ethiodide and 5 parts of 2-methyl benzoselenazole ethiodide were dissolved in absolute alcohol and the solution heated to the boiling point under a reflux condenser. Then .8 part of potassium hydroxide in 40 parts absolute alcohol was added down the condenser drop by drop. The solution was heated at the boiling point for 30 minutes and then evaporated to small volume and allowed to crystallize. The chief product was a yellow crystalline cyanine 3,3'-diethyl thioselenocyanine iodide, but it was contaminated by a pink dye which can be removed by three recrystallizations from alcohol.

A solution of the yellow material, added to a photographic emulsion (for example .030 gram of compound in 30 cc. of alcohol added to a liter of emulsion) confers an extra sensitivity to the emulsion with maximum at 4700 Å.

EXAMPLE IX

Preparation of 3,3'-diethyl 6,5'-dimethyl thiocyanine iodide

A mixture of 0.3 part 2-iodo-6-methyl benzothiazole ethiodide, 0.22 part 2,5-dimethyl benzothiazole ethiodide and 12 parts absolute alcohol was brought to a boil and treated with .21 part of tri-n-propylamine, and refluxing continued for 20 minutes. A brown-yellow color developed that turned pinkish. On cooling, crystals separated which by several crystallizations from alcohol are obtained as yellow in color. The red color in the crude solution is due to the formation of a small amount of another dye.

A solution of the yellow compound, added to a photographic emulsion (for example .030 gram of compound in 30 cc. of alcohol added to a liter of emulsion) confers an extra sensitivity to the emulsion, with maximum at 4700–4800 Å.

It will be understood that other variations may be made in forming the dyes as shown in Examples VII, VIII and IX. For instance, other unreactive solvents may be employed and other basic condensing agents may be used, such as triethylamine, diethanolamine, triethanolamine and the like. By using a quaternary salt of a 2-ethyl benzothiazole or a 2-ethyl benzoselenazole, instead of a 2-methyl derivative, substitution by an alkyl group on the methine carbon atom can be obtained. Thus, if a 2-ethyl derivative is used, the methine carbon atom will be substituted by a methyl group. If a 2-propyl derivative is employed, it will be substituted by an ethyl group, etc. It will be apparent that by varying the reactive alkyl groups and the substituents in the aromatic nuclei, a wide variety of symmetrical and unsymmetrical dyes may be obtained.

Although no specific examples have been given showing the application of the process to the preparation of oxacyanines, it will be understood that the invention is likewise applicable to the preparation of such compounds, for instance, by the reaction of a 2-halogeno benzoxazole quaternary salt with a 2-alkyl benzoxazole quaternary salt or with a 2-alkyl benzothiazole quaternary salt or with a 2-alkyl benzoselenazole quaternary salt. Likewise, a quaternary salt of a 2-halogeno benzothiazole or benzoselenazole may be reacted with a 2-alkyl benzoxazole quaternary salt.

The method of nomenclature herein employed is one of the usual methods in which the numbering is started with the hetero atom having the highest atomic weight. In other words, oxygen, sulfur or selenium occupies the 1-position, carbon the 2-position and nitrogen the 3-position of the heterocyclic nucleus. The numbering may be illustrated by the compound of Example VII which has the following general formula:

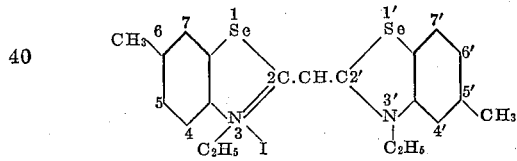

The dye of Example VII may be termed an unsymmetrical selenocyanine. The dye of Example VIII is an unsymmetrical thioselenocyanine, more specifically, 3,3'-diethyl thioselenocyanine iodide, and the dye of Example IX may be called an unsymmetrical thiocyanine iodide. Other methods of nomenclature may be used, for example, according to the nomenclature sometimes adopted, numbering of the heterocyclic ring is started with the carbon atom alpha to the nitrogen atom, this carbon atom being in the 1-position, the nitrogen atom being in the 2-position and so on, clockwise around the aromatic nucleus.

The dyes prepared in accordance with the invention are useful in dyeing fibrous materials but are particularly useful for sensitizing photographic films, plates and emulsions. This may be accomplished in a manner well known in the art, either by bathing the plate or film with a solution of the dye or by incorporating the dye into an emulsion, for example, a gelatino silver halide emulsion.

As many apparently widely different embodiments of this invention may be made without departing from the spirit and scope thereof, it is to be understood that we do not limit ourselves to the specific embodiments thereof except as described in the following claims.

We claim:

1. A method of preparing cyanine dyes which comprises reacting a quaternary salt from the group consisting of 2-halogeno thiazole, oxazole and selenazole alkyl quaternary salts with a 2-alkyl alkyl quaternary salt selected from the group consisting of thiazole, oxazole and selenazole alkyl quaternary salts, under the influence of heat in the presence of a basic condensing medium.

2. A method of preparing cyanine dyes which comprises reacting a 2-halogeno benzoselenazole alkyl quaternary salt with a 2-alkyl benzoselenazole alkyl quaternary salt, under the influence of heat in the presence of a basic condensing agent.

3. In a process of preparing cyanine dyes, the step which comprises reacting a 2-halogeno benzothiazole alkyl quaternary salt with a 2-alkyl benzothiazole alkyl quaternary salt, under the influence of heat in the presence of a basic condensing agent.

4. In a process of preparing cyanine dyes, the step which comprises reacting a 2-halogeno benzothiazole alkyl quaternary salt with a 2-alkyl benzoselenazole alkyl quaternary salt, under the influence of heat in the presence of a basic condensing agent.

5. In a process of preparing cyanine dyes, the step which comprises reacting a 2-halogeno alkyl quaternary salt selected from the group consisting of thiazole, oxazole and selenazole alkyl quaternary salts with a 2-methyl alkyl quaternary salt selected from the group consisting of oxazole, thiazole and selenazole alkyl quaternary salts, under the influence of heat in the presence of a basic condensing agent.

6. In a process of preparing cyanine dyes, the step which comprises reacting a 2-iodo alkyl quaternary salt from the group consisting of oxazole, selenazole and thiazole alkyl quaternary salts with a 2-methyl alkyl quaternary salt from the group consisting of oxazole, selenazole and thiazole alkyl quaternary salts, under the influence of heat in the presence of a basic condensing agent.

7. A method of preparing 3,3'-diethyl 6.5'-dimethyl selenocyanine iodide, which comprises reacting 2-iodo-6-methyl benzoselenazole ethiodide with 2,5-dimethyl benzoselenazole ethiodide under the influence of heat in the presence of a basic condensing agent.

8. A method of preparing 3.3'-diethyl thioselenocyanine iodide, which comprises reacting 2-iodobenzothiazole ethiodide with 2-methyl benzoselenazole ethiodide under the influence of heat in the presence of a basic condensing agent.

9. A method of preparing 3.3'-diethyl 6.5'-dimethyl thiocyanine iodide, which comprises reacting 2-iodo-6-methyl benzothiazole ethiodide with 2,5-dimethyl benzothiazole ethiodide under the influence of heat in the presence of a basic condensing agent.

EDMUND B. MIDDLETON.
GEORGE A. DAWSON.